United States Patent [19]

Campbell

[11] 4,317,586
[45] Mar. 2, 1982

[54] PIPE STRESS/STRAIN NEUTRALIZER

[76] Inventor: Joseph K. Campbell, 215-52nd St., Delta, British Columbia, Canada, V4M 2Y3

[21] Appl. No.: 6,439

[22] Filed: Jan. 25, 1979

[51] Int. Cl.³ ............................................. F16L 27/00
[52] U.S. Cl. ........................................ 285/95; 285/223; 285/302; 285/370; 285/DIG. 1; 285/165; 285/166
[58] Field of Search .................. 285/95, DIG. 1, 114, 285/226, 228, 223, 101, 106, 370, 302

[56] References Cited

U.S. PATENT DOCUMENTS

| | | | |
|---|---|---|---|
| 2,545,701 | 3/1951 | McCausland | 285/228 |
| 3,129,960 | 4/1964 | Schrodt | 285/95 |
| 3,458,219 | 7/1969 | Wesch | 285/370 X |
| 3,889,985 | 6/1975 | Gartmann | 285/95 |
| 3,993,334 | 11/1976 | Fridman et al. | 285/370 X |

FOREIGN PATENT DOCUMENTS

| | | | |
|---|---|---|---|
| 2155981 | 5/1973 | Fed. Rep. of Germany | 285/226 |
| 1315059 | 12/1962 | France | 285/228 |

*Primary Examiner*—Thomas F. Callaghan
*Attorney, Agent, or Firm*—Sim & McBurney

[57] ABSTRACT

There is provided a pressure-compensating pipe joint which includes sleeve members adapted to be affixed to respective lengths of pipe to be joined, and telescoping means which allows the sleeve members to move axially with respect to each other while maintaining fluid-type communication between them.

A number of piston-type contraction units are located exteriorly of the sleeve members and of the telescoping means, and are connected to link members attached to the sleeve members. By placing the contraction units outside of the general telescoping arrangement of the pipe joint, replacement and repair of these units is a relatively simple matter.

2 Claims, 5 Drawing Figures

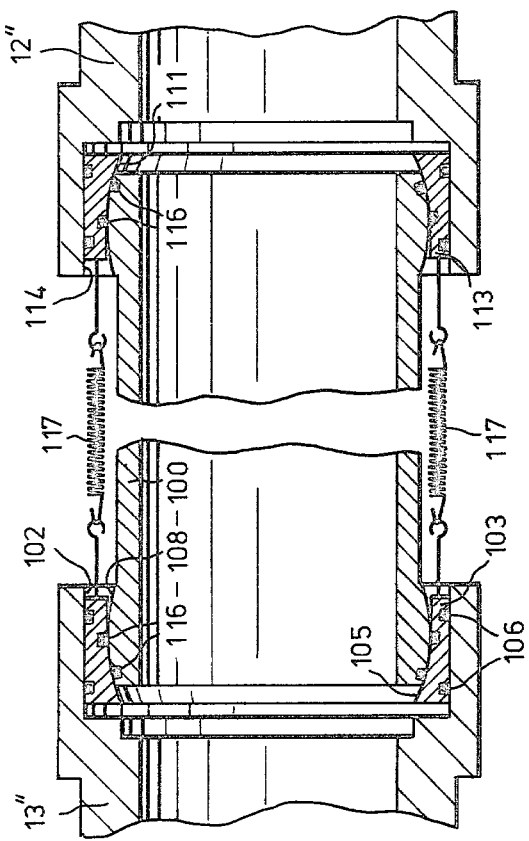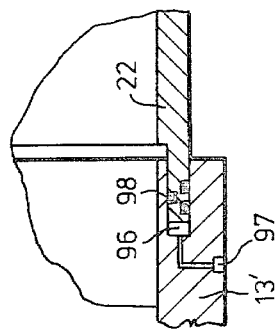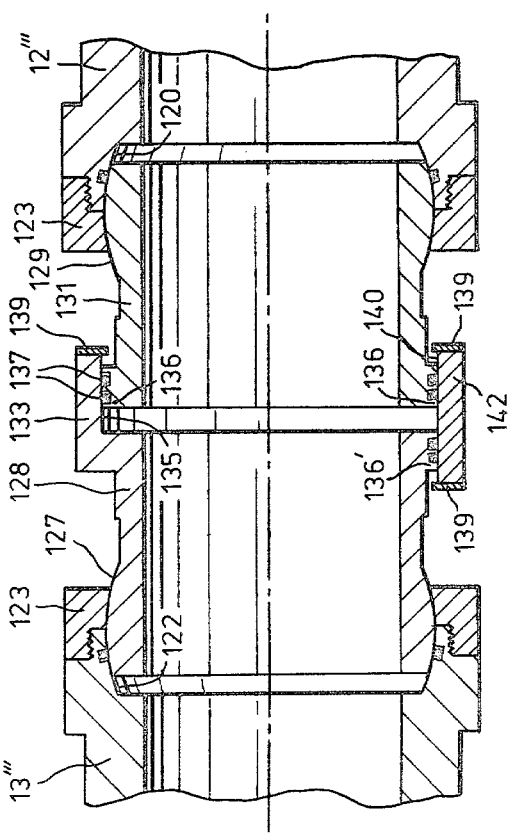

PIPE STRESS/STRAIN NEUTRALIZER

This invention relates generally to pipe couplings and has to do particularly with a pressure-compensated coupling which is adapted to permit relative movement of one pipe end with respect to the other pipe end to which it is coupled. This movement may be in the sense of articulation of one pipe end with respect to the other about an axis which is normal to both pipe ends, or again may be in the sense of longitudinal (telescoping) movement or rotational movement of one pipe end with respect to the other about a common axis.

In conventional constructions of pipe couplings which permit some degree of movement of the one pipe end with respect to the other, there has been a constant problem of high cost, primarily relating to the complex structure of the coupling.

In my own earlier U.S. Pat. No. 4,018,463, dated Apr. 19, 1977, and entitled "Pipe Stress/Strain Neutralizer", a configuration of pipe coupling is provided, which is adapted to permit relative movement of one pipe end with respect to the other, either longitudinally, or both longitudinally and articulably. All embodiments in my earlier U.S. Pat. No. 4,018,463 are capable of permitting rotational movement of the one pipe end with respect to the other.

I have now devised an improved structure as compared with that which is disclosed in my earlier U.S. Pat. No. 4,018,463. My improvement reduces generally the size of the compensatory components of the pipe joint, and places these components to the exterior of the pipes themselves in an unenclosed environment, thereby making the parts very simple to machine on small machine tools, and making the overall pipe joint readily capable of disassembly, repair and replacement in terms of parts.

In my earlier U.S. Pat. No. 4,018,463, the compensating portions were all encased in a large outside cylindrical portion having a maximum diameter appreciably larger than the pipe diameters which the coupling was intended to join. Large annular members were also provided within the cylindrical member, the annular members also being of considerable size, approaching that of the cylindrical member. Articulating connections attached to the annular members were located within the space enclosed by the cylindrical member, and thus could not be got at for repair or replacement without first entirely disassembling the pipe joint by removal of the cylindrical member. In the embodiments disclosed in my earlier U.S. Pat. No. 4,018,463, this could not take place while the pipe remained filled with liquid or fluid under pressure, because the cylindrical member was a pressure-containing member, and its removal would have allowed liquid or fluid to escape from the pipes.

Accordingly, this invention provides a pipe joint comprising:

a first sleeve member adapted to be affixed to an end of a first length of pipe, a second sleeve member adapted to be affixed to an end of a second length of pipe, telescoping means allowing the sleeve members to move axially with respect to each other while maintaining fluid-tight communication between them, a plurality of contraction units located exteriorly of the sleeve members and the telescoping means, each including a first link member having an end adapted to be fixed with respect to the first length of pipe, and a second link member having an end adapted to be fixed with respect to the second length of pipe, a piston supported by one link member, a cylinder supported by the other link member and engaging said piston so as to define a variable closed volume on the side of the piston toward the sleeve member to which said one link member is attached, and fluid-conduit means connected between the space inside one of the sleeves and said closed volume, whereby the pressure in said closed volume is a function of the pressure inside said one of the sleeves.

Three embodiments of this invention are illustrated in the accompanying drawings, in which like numerals denote like parts throughout the several views, and in which:

FIG. 3 is a partial axial sectional view showing a variant in construction for the first embodiment of this invention;

FIG. 4 is an axial sectional view of a second embodiment of this invention; and

FIG. 5 is an axial sectional view of a third embodiment of this invention.

Figures 1, 2:
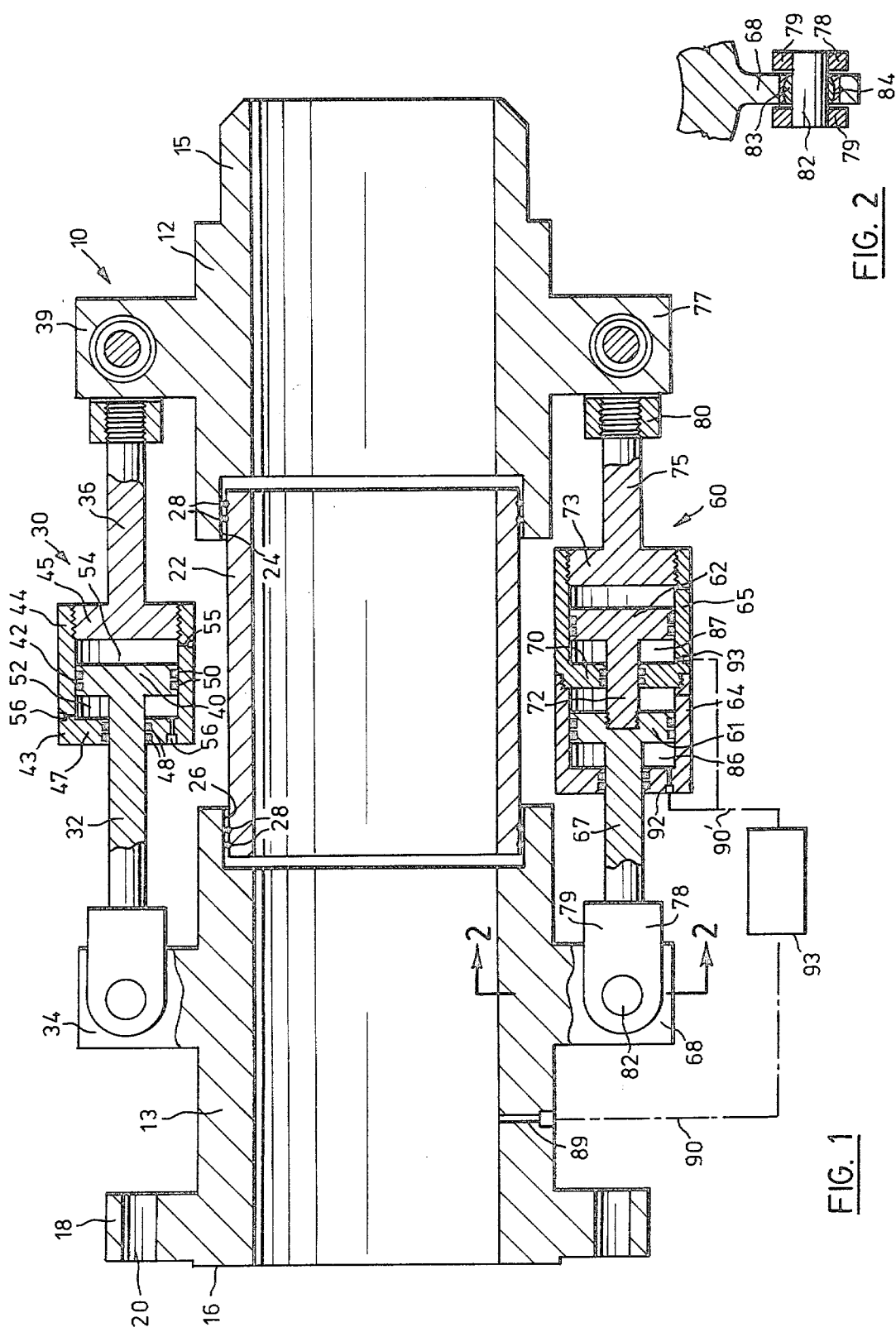
FIG. 1 is an axial sectional view of a first embodiment of this invention.
FIG. 2 is a partial cross-sectional view taken at the line 2—2 in FIG. 1.

Attention is first directed to FIG. 1, in which a pipe coupling shown generally at 10, is seen to include a first sleeve member 12 and a second sleeve member 13. Each of the sleeve members 12 and 13 is adapted to be affixed to an end of a respective length of pipe. In the case of the sleeve member 12, an end-bevelled portion 15 of reduced diameter is provided, to be inserted into the end of a section of pipe, in shrink-fit or welded relationship.

For the sleeve member 13, there is provided an abutment surface 16, and a radially outwardly projecting flange 18 having apertures 20 through which bolts or similar fastening members may be passed. It is understood that the sleeve member 13 would be abutted against a similarly shaped pipe end, with an apertured flange corresponding to the flange 18. A gasket would be placed between them at the location of the abutting surface 16, and fastening members would be used to secure the pipe end to the sleeve member 13.

In a general sense, telescoping means are provided to allow the sleeve members 12 and 13 to move axially with respect to each other while maintaining a fluid-tight communication between them. In the case of FIG. 1, the telescoping means is seen to include a cylindrical member 22 which is telescopingly and sealingly slidable within the sleeve members 12 and 13. More particularly, the sleeve member 12 has an inner, undercut cylindrical surface 24, and the sleeve member 13 has a similar inside cylindrical surface 26, of the same diameter as surface 24. The cylindrical member 22 has a uniform outside diameter only slightly smaller than the inside diameter of the cylindrical surfaces 24 and 26, and is adapted to be inserted into relationship with the surfaces 24 and 26, with suitable O-ring type sealing means 28 to effect a seal.

The first embodiment of this invention shown in FIG. 1 further comprises a plurality of contraction units located exteriorly of the sleeve members 12 and 13 and the cylindrical member 22.

The first variant of the sleeve member is shown in the upper part of FIG. 1 at the numeral 30, and is seen to include a first link member 32 which is attached to the sleeve member 13 through an integral post 34, and a second link member 36 which is attached to the sleeve member 12 at an integral post 39.

A piston 40 is supported at the end of the link member 32, and has a cylindrical outer surface 42. A cylinder 43 is supported on the other link member 36 and engages the piston 40. The cylinder 43 includes a cup-shaped member 44 which is threaded on an enlargement 45 at the leftward end of the link member 36. The cup member 44 has a leftward end wall 47, with a central cylindrical bore through which the link member 32 passes, the latter being cylindrical in outer configuration. The link member 32 is a close fit inside the central bore through the end wall 37, and O-ring sealing members 48 are provided to effect a seal at this juncture. Between the piston 40 and the cylindrical wall 44 are provided two further O-rings 50 for sealing purposes. A closed volume 52 of variable size is thus defined on the leftward side of the piston 40, which is the side toward the sleeve member to which its own link member is attached. There is also defined a volume 54 to the right of the piston 50. The volume 54 is vented to the atmosphere through a vent hole 55.

Connection apertures 56 are provided, communicating with the volume 52, to allow for pressurized fluid to be admitted to the volume 52, in order to compensate for the axially separating force naturally arising between any two pipe ends which are linked together and which contain liquid or fluid under pressure. The means for bringing such pressurized liquid or fluid to the variable closed volume 52 will be described subsequently.

In the upper portion of FIG. 1, the contraction unit 30 which is illustrated includes a single piston 40. At the lower part of FIG. 1, a contraction unit shown generally at the numeral 60 is similar to the contraction unit 30, but differs therefrom only in providing two pistons 61 and 62, which ride in two cylinders 64 and 65, respectively. The cylinders 64 and 65 are in effect attached together, but can be considered for the sake of this discussion to be like two cylinder each acting separately, but with the forces produced acting in tandem. In FIG. 1 at the lower part, the leftward piston 61 is in every respect the same as the piston shown at the top in FIG. 1, being integral with a link member 67 similar to the link member 32, and being connected to a radially outwardly projecting post 68 similar to the post 34. The cylinder 64 is directly comparable to the cylinder 43 at the top of FIG. 1. The cylinder 64 is threaded into engagement with a partition member 70 which constitutes the leftward wall of the cylinder 65 enclosing the piston 62. The piston 62 is integral with a short link member 72 which is in threaded engagement with the centre of the piston 61, as seen.

Thus, the two pistons 61 and 62 move in tandem through their separately defined cylinders 64 and 65, but the latter are also connected together to move in tandem.

At the right of the cylinder 65, the latter is threadedly connected to an expanded portion 73 at the leftward end of a link member 75, the latter being similar in all respects to the link member 36 at the top of FIG. 1. The link member 75 is connected to a radially outwardly projecting post 77 the same as the post 39.

Attention is now directed to the post 68 in FIG. 1, which is shown in section in FIG. 2. At the left of the link member 67 is a yoke 78 having two flanges 79 and a back wall linking the flanges 79, into which back wall the leftward end of the link member 67 is threadedly engaged. An identical yoke is provided at the rightward end of the link member 75, and at the right in FIG. 1 that yoke member is shown in axial section, such that the back wall 80 is seen and has been drawn as hatched.

Extending between the two flanges 79 is a pivot pin 82, which as seen in FIG. 2 passes through a spherical bearing 83, in turn received within a spherical bearing seat member 84 in turn affixed to the post 68 by conventional means. By virtue of this structure shown in FIG. 2, it will be understood that the pivot pin 82 is able to angulate to a limited degree with respect to the post 68, both in the plane of the paper as seen in FIG. 2, and in the plane perpendicular to the drawing paper and containing the axis of the pivot pin 82. Thus a considerable degree of articulating freedom is given to the link 67 with respect to the post 68. The same yoke and spherical bearing construction is provided at the attachment ends of all of the link members 32, 36, 67 and 75.

It is to be understood that for any given coupling construction, the contraction units would normally all be the same around the unit. Two different types of contraction unit have been illustrated in FIG. 1 merely in order to avoid needless repetition of the other drawing components.

As seen at the bottom in FIG. 1, a fluid-conduit means is connected between the space inside the sleeve member 13 and both of the closed volumes 86 and 87. A connection port 89 is provided through the wall of the sleeve member 13, and it is to be understood that a tubing or pipe would follow the path shown by broken line 90 in FIG. 1, and would extend to the entry ports 92 and 93, respectively opening into the closed volumes 86 and 87. The box shown at 93 may be either a fluid isolation device, or a pressure multiplier of conventional design. For fluid isolation (which also takes place automatically in a pressure multiplier), the box 93 would represent a simple cylinder having a movable piston and communication ports with the two volumes on either side of the piston. The line 90 would be connected to one volume, and the line 90' would be connected to the other. Since the piston area would be the same on either side, the pressure in line 90 would always be the same as the pressure in line 90'. This would in effect allow the fluids or liquids in the lines 90 and 90' to be different, while still allowing the pressure applied to the closed volumes 86 and 87 to be the same as that existing within the sleeve member 13.

It will thus be understood that, by introducing the pressure within the sleeve member 13 into the closed volumes 86 and 87, a force will be set up tending to urge the pistons 61 and 62 to the right with respect to the cylinders 64 and 65, which in effect will create a force tending to draw the posts 68 and 77 together. This will tend to compensate for the separative force which naturally exists between two connected pipe sections carrying fluid or liquid under pressure.

By appropriately selecting the sizes and numbers of the contraction units 60, it is possible to exactly compensate for the separative pressure in the pipe, to slightly under-compensate for the pressure if desired, or to slightly over-compensate if desired.

In the case of the contraction unit shown at the top in FIG. 1, precisely the same considerations would apply. The pressure within the sleeve member 13 is communicated to the variable closed volume 52, and this causes the piston 40 to be urged to the right with respect to the cylinder 43, thereby causing the posts 34 and 39 to be drawn together.

Returning to the box 93, it has been said that this could also represent a pressure multiplier. These units are well known and are standard off-the-shelf items which can be readily purchased. Their effect is to cause the pressure in one of the lines 90, 90' to be always a direct function of the pressure in the other of the lines. For example, the pressure in the one line might be two times, 1.5 times, 0.75 times, etc. the pressure in the other pipe.

It will be appreciated that by using a pressure multiplier at the location of the box 93, either the number or the size of the contraction units 60 could be decreased for a given pipe diameter.

FIG. 3 shows a further constructional variant of the embodiment shown in FIG. 1, in which the cylindrical member 22 is inserted in sealing relationship into an annular groove 96 in sleeve member 13'. An access port 97 allows for the possibility of providing pressurized fluid or liquid from the interior of the sleeve member 13 to be admitted to the annular recess 96, in order to improve the seal between the cylindrical member 22 and the sleeve member 13. It is to be understood that this particular form of construction would be used at both ends of the cylindrical member 22.

The angular recesses 96 in FIG. 3 are useful in situations where the fluid or gas in the pipe is dirty or contains materials such as grit particles which could damage a pressure-containing seal. The intention is to allow the recesses 96 to be primed with clean fluid at or close to the same pressure as the fluid in the pipe. This would in most cases require an interfacing member such as the component 93 which would pass on the pressure within the pipe but would keep grit etc. from having access to the annular recesses 96.

It will be realized, that the single seal 98 between the pressure in the pipe and the annular recess 96, in fact experiences virtually no differential pressure, and functions more as a means of separating the dirty fluid from the clean fluid. A further advantage of the annular recess 96 is that in the event that the pressure level contained within the main pipe is 'pulsing', (which is usually a function of the blade passing frequency of the pumping or compressing machinery), the fluid in the annular recess 96 will tend to act as a dampener to prevent or smooth out any movement which might otherwise have been caused by the pulsing.

Attention is now directed to FIG. 4 of the drawings, which shows the second embodiment of the invention. FIG. 4 is an axial sectional view of only the telescoping means, since the remainder of the pipe joint involving the contraction units 30 or 60 remains unchanged.

The second embodiment of this invention is capable of a significant degree of articulation about an axis normal to the pipe lengths connected by the pipe joint, i.e. with the pipes bending away from a position of axial alignment with each other. This freedom of articulation is provided due to spherical connections between a cylindrical member 100 and the appropriate ends of sleeve members 13" and 12". More particularly, the sleeve member 13" provides an internal cylindrical surface 102 along which a ring member 103 is adapted to slide. The ring member 103 defines a cylindrical surface on its outside which is received snugly but slidably within the surface 102, and defines a spherical surface 105 on its inside. Suitable O-rings 106 are provided between the ring member 103 and the sleeve 13".

The leftward end of the cylindrical member 100 is shaped to define a male spherical bearing surface 108 mating with the female spherical bearing surface 105 of the ring member 103.

Likewise, at the rightward end of the cylindrical member there is further male spherical bearing surface 110 which mates with a female spherical bearing seat 111 in a further ring member 113 slidably received within an internal cylindrical surface 114 of the sleeve member 12".

The seal between the male surfaces and the corresponding female seats is ensured by O-rings 116, and these surfaces are maintained in sealed contact by coil springs 117, which may be of any size and number capable of keeping the seals tight.

It can thus be seen that the arrangement of FIG. 4 is capable of permitting longitudinal axial movement of the pipe ends with respect to each other, due to the slidability of the ring members 103 and 113 with respect to the sleeve members 13" and 12", respectively. Furthermore, the individual sleeve members 13" and 12" can angulate or articulate with respect to the appropriate end of the cylindrical member 100, in order to allow for articulation between the sleeve members themselves, and thus the pipe ends.

FIG. 5 shows the third embodiment of this invention, which is also adapted to permit articulation or angulation between the pipe ends. In the FIG. 5 arrangement, the sleeve members 12''' and 13''' each define a female spherical bearing seat 120 and 122, respectively. To give the female bearing seat a maximum diameter at a location other than the open end, a ring member 123 is threaded onto the projecting ends of the respective sleeve members 12''' and 13'''. Captured within the female spherical bearing seat 122 is a male spherical bearing surface 127 on the leftward end of a first cylindrical member 128. Captured within the female spherical bearing seat 120 is a male spherical bearing surface 129 on the rightward end of a second cylindrical member 131.

The cylindrical members 128 and 131 are shown to be slidably linked together by one particular arrangement in the upper half of FIG. 5, and by an alternative arrangement in the lower half of FIG. 5. It is to be understood that what is shown above and below the centreline would not simultaneously apply. In a given installation, the section at the top would be used all the way around, or alternatively the section at the bottom would be utilized. In the upper part of FIG. 5, it can be seen that the cylindrical member 128 has an outwardly stepped cylindrical projection 133 which defines an internal cylindrical surface 135. The cylindrical member 131 has a short outward flange portion 136 defining an external cylindrical surface adapted to be snugly but slidably received within the surface 135. O-rings 137 are provided for sealing purposes. An end cap 139 is provided to ensure that the flange 136 will not move out of contact with the surface 135.

In the lower part of FIG. 5, the alternative construction is one in which both of the cylindrical members 128 and 131 have identical outward flanges 136' and 136 respectively. These flanges have similar external cylindrical surfaces which ride snugly but slidably within the internal cylindrical surface 140 of an external ring 142, which surrounds the inner ends of both of the cylindrical members 128 and 131.

The ring member 142 has two end caps 139 to prevent the cylindrical members 128 and 131 from becoming disengaged with the ring member 142.

In all of the embodiments thus far described, some degree of rotational movement of one sleeve member with respect to the other is possible, due to the universal joint nature of the connection between the yokes at the ends of the link members, and the posts to which the yokes are attached. Typically, two pipe ends connected together would not be called upon to rotate through a significant angle with respect to each other, but a small degree of rotational freedom, covering up to a few degrees, is desirable in order to ease stress in the connected members.

I claim:

1. A pipe joint comprising:

a first sleeve member adapted to be affixed to an end of a first length of pipe, a second sleeve member adapted to be affixed to an end of a second length of pipe, telescoping means allowing the sleeve members to move axially with respect to each other while maintaining fluid-tight communication between them, a plurality of contraction units located exteriorly of the sleeve members and the telescoping means, each including a first link member having an end adapted to be fixed with respect to the first length of pipe, and a second link member having an end adapted to be fixed with respect to the second length of pipe, two pistons supported in stacked relationship on said one link member, and two cylinders supported by the other link member, each cylinder enclosing one of the pistons and each defining a variable closed volume on the side of the piston toward the sleeve member to which said one link member is attached, and fluid-conduit means connected between the space inside one of the sleeves and both of said closed volumes, whereby the pressure in said closed volumes is a function of the pressure inside said one of the sleeves.

2. The pipe joint claimed in claim 1, in which the first link member is directly attached to said first sleeve member, and in which the second link member is directly attached to the second sleeve member.

* * * * *